(12) United States Patent
Dinger et al.

(10) Patent No.: US 8,398,140 B2
(45) Date of Patent: Mar. 19, 2013

(54) APPARATUS FOR EXTENDING VEHICLE CARGO AREA

(75) Inventors: Kevin D. Dinger, West Bloomfield, MI (US); James G. Gobart, Rochester, MI (US); Albert H. Butlin, Jr., Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 156 days.

(21) Appl. No.: 12/966,358

(22) Filed: Dec. 13, 2010

(65) Prior Publication Data

US 2012/0146355 A1    Jun. 14, 2012

(51) Int. Cl.
*B60R 7/08* (2006.01)
(52) U.S. Cl. ....... 296/37.5; 296/56; 296/106; 296/146.8
(58) Field of Classification Search ................ 296/26.04, 296/26.06, 26.08, 26.11, 37.1, 37.5, 50, 55, 296/57.1, 146.8, 146.9, 56, 106
See application file for complete search history.

(56) References Cited

U.S. PATENT DOCUMENTS

| 5,967,054 | A | 10/1999 | Rosenfeld | |
| 6,827,383 | B2* | 12/2004 | Lacy | 296/26.09 |
| 2001/0033088 | A1* | 10/2001 | Terhaar et al. | 296/106 |
| 2008/0277956 | A1* | 11/2008 | Karuppaswamy | 296/37.1 |
| 2008/0284190 | A1* | 11/2008 | Leitner et al. | 296/26.11 |
| 2010/0283280 | A1* | 11/2010 | Kohlstrand et al. | 296/26.11 |

* cited by examiner

*Primary Examiner* — Glenn Dayoan
*Assistant Examiner* — Jason S Daniels
(74) *Attorney, Agent, or Firm* — Quinn Law Group, PLLC

(57) ABSTRACT

An apparatus for a vehicle includes a first panel that defines a loading surface and has first and second sides. The apparatus also includes a support frame connected to the first panel and having first and second supports. A second panel is pivotably connected to the first panel. The first and second supports are configured to be selectively connectable to and releasable from the vehicle body. The apparatus is positionable in a stowed position when the supports are connected to the vehicle body. In the stowed position, the apparatus is within the interior cargo area and the first panel is substantially parallel with and above the floor. The apparatus is pivotable with respect to the vehicle body to a deployed position in which the supports are connected to the vehicle body and in which the apparatus extends at least partially out of the vehicle to provide additional cargo area.

16 Claims, 4 Drawing Sheets

APPARATUS FOR EXTENDING VEHICLE CARGO AREA

TECHNICAL FIELD

The invention relates to an apparatus for a vehicle for extending the cargo area of the vehicle.

BACKGROUND

There are many occasions on which a vehicle owner may desire additional cargo space, such as for transporting luggage, furniture, camping gear, or picnic items. Pickup trucks offer a relatively large amount of cargo space, most of which is in a truck bed exterior, but offer a relatively small passenger compartment in comparison to other vehicle options, such as sport utility vehicles. Because a smaller, fixed interior cargo space adequately serves customers' needs for most occasions, many customers may choose not to purchase a vehicle with greater cargo space needed only in limited instances.

SUMMARY

An apparatus is provided that offers a flexible amount of vehicle cargo space, allowing a vehicle user the option of additional vehicle cargo space when needed. Specifically, the apparatus is for extending the cargo area of a vehicle. The apparatus includes a first panel that defines a loading surface and has first and second sides. The apparatus also includes a support frame with first and second supports. A second panel is pivotably connected to the first panel between the first and second sides. The first and second supports are configured to be selectively connectable to and releasable from the vehicle body. The apparatus is positionable in a stowed position when the supports are connected to the vehicle body. In the stowed position, the apparatus is within the interior cargo area of the vehicle and the first panel is substantially parallel with and above the floor. In the stowed position, two-tier loading of cargo is enabled as cargo can be supported on the floor and additional cargo can be supported above the floor on the loading surface of the first panel. The apparatus is pivotable with respect to the vehicle body to a deployed position in which the supports are connected to the vehicle body and in which the apparatus extends at least partially out of the vehicle, increasing the cargo area of the vehicle. The apparatus may have a striker that enables a latch on a rear closure panel of a rear hatch-type vehicle to latch to the apparatus in the deployed position, further securing the apparatus and cargo while transporting the cargo.

Because the apparatus is easily installable and removable from the vehicle, it can be used when desired, and then removed to decrease weight and maintain optimal fuel economy. The apparatus may be made of relatively lightweight yet sufficiently strong material(s) to minimize fuel economy impact.

The above features and advantages and other features and advantages of the present invention are readily apparent from the following detailed description of the best modes for carrying out the invention when taken in connection with the accompanying drawings.

DETAILED DESCRIPTION

Figure 1:
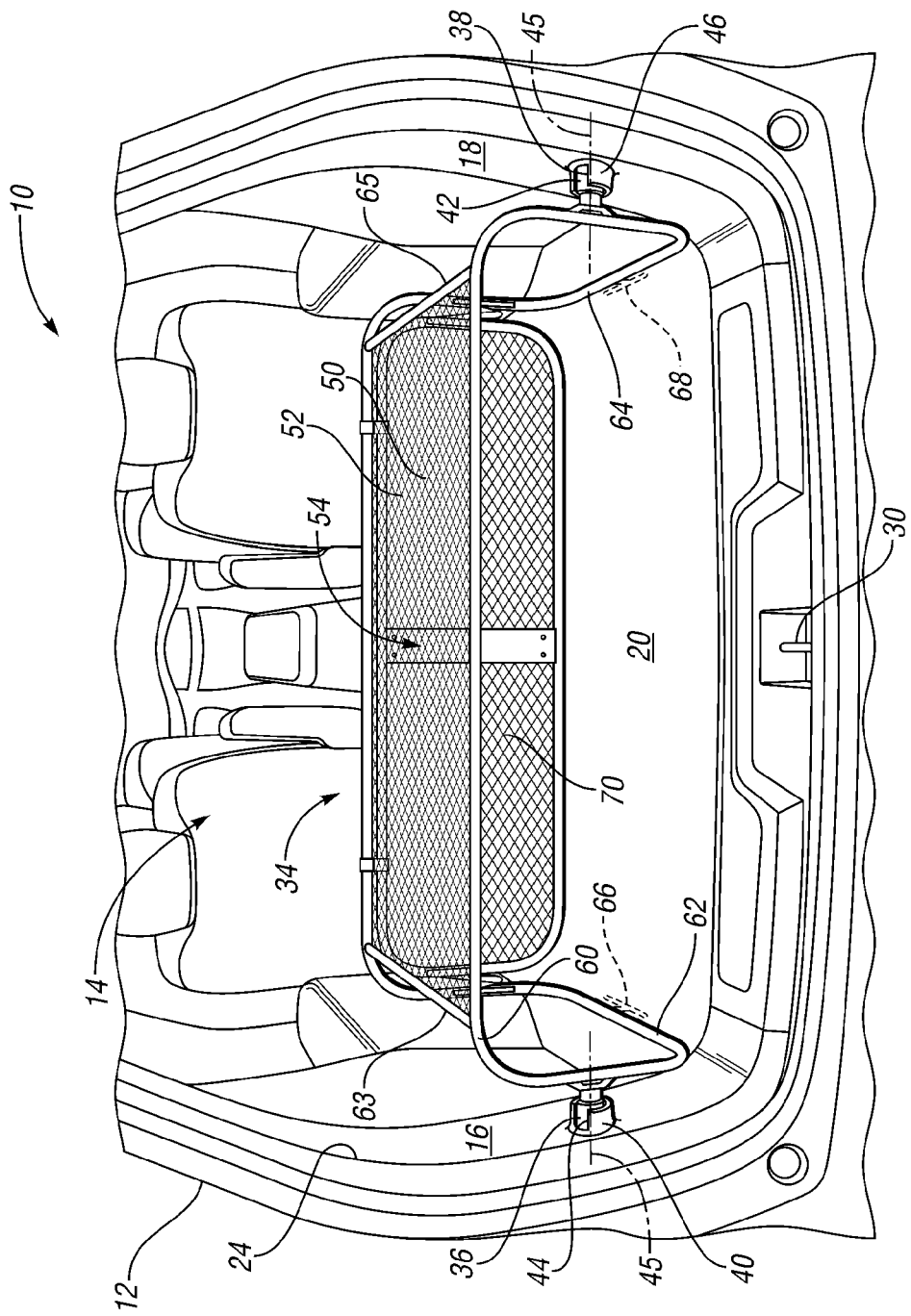
FIG. 1 is a schematic illustration in fragmentary perspective view of a vehicle with a cargo area extender apparatus in a stowed position.
Figure 2:
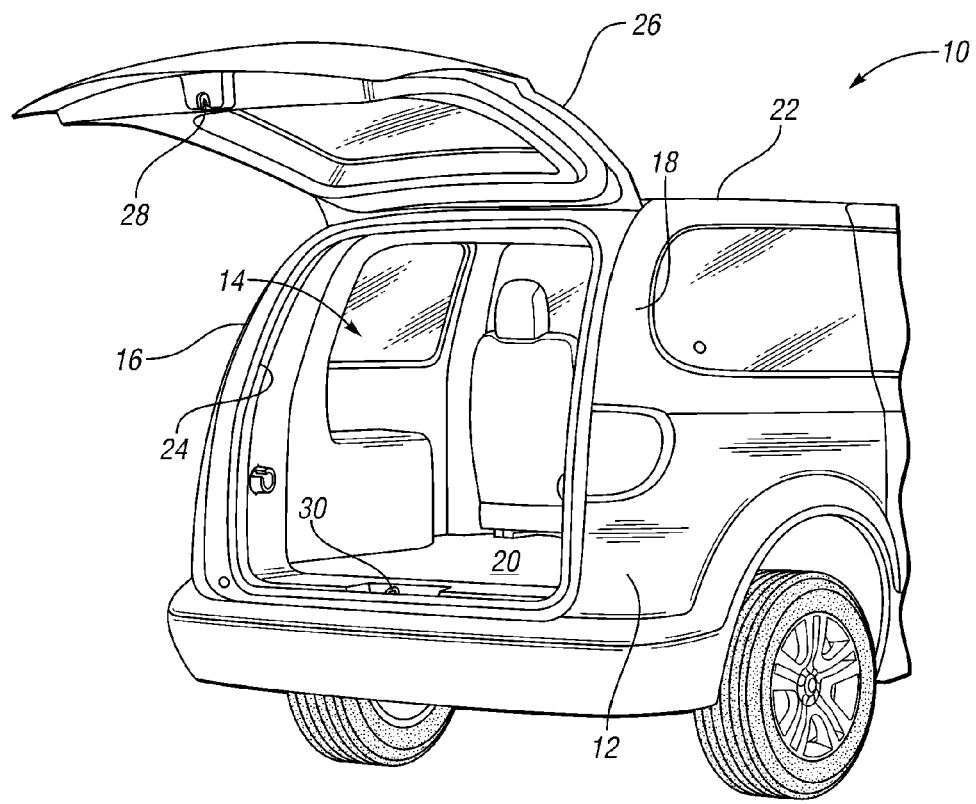
FIG. 2 is a schematic perspective fragmentary illustration of the vehicle of FIG. 1 with the apparatus removed and showing a rear hatch closure panel in an open position.

Referring to the drawings, wherein like reference numbers refer to like components throughout the several views, FIG. 1 shows a vehicle 10 having a vehicle body 12 defining an interior cargo area 14. As best shown in FIG. 2, the vehicle body 12 includes two sides 16, 18, a load floor 20, and a roof 22, partially defining a rear opening 24 permitting access to the interior cargo area 14.

Figure 3:
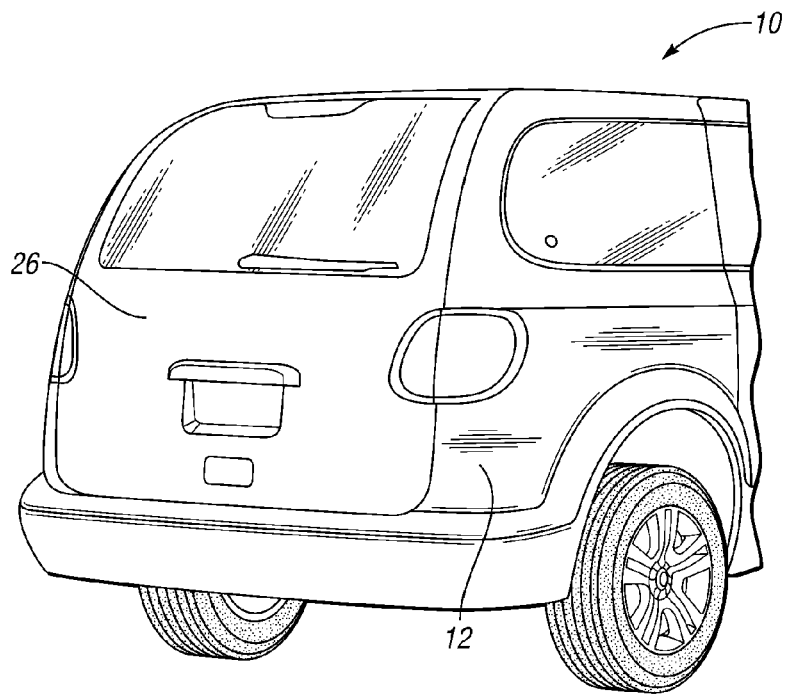
FIG. 3 is a schematic perspective fragmentary illustration of the vehicle of FIGS. 1 and 2 with the rear hatch closure panel closed.

Referring to FIG. 2, the vehicle 10 is a rear hatch-type vehicle, and has a rear hatch closure panel 26 hinged to the vehicle body 12 near the roof 22. The rear hatch closure panel 26 is also referred to as a liftgate and is openable and closable. In the open position of FIGS. 1 and 2, it permits access to the interior cargo area 14 through the opening 24. The rear hatch closure panel 26 has a latch 28. The latch 28 is configured to engage a first striker 30 connected to the vehicle body 12 to close the opening 24, securing the rear hatch closure panel 26 to the vehicle body 12 when in the closed position of FIG. 3.

Referring again to FIG. 1, a cargo area-extending apparatus 34 is pivotably connected to the vehicle 10 within the interior cargo area 14 at the side walls 16, 18. The cargo area-extending apparatus 34 is shown in a stowed position in FIG. 1, in which it is entirely within the interior cargo area 14. The cargo area-extending apparatus 34 is supported at first and second post portions 36, 38, also referred to as projections or trunnions, which form an axis 45 about which the cargo area-extending apparatus 34 pivots to the deployed position of FIGS. 5-7. In the deployed position, the cargo area-extending apparatus 34 extends outside of the vehicle 10, beyond the interior cargo area 14, to extend the cargo area of the vehicle 10 as described herein. Partial cylindrical support members 40, 42 extend from the side walls 16, 18 and have slots 44, 46 at which the post portions 36, 38 can be inserted into and removed from the end supports 40, 42, enabling the cargo area-extending apparatus 34 to be easily installed in the vehicle 10 or released from the side walls 16, 18 for removal from the vehicle 10.

Figure 4:
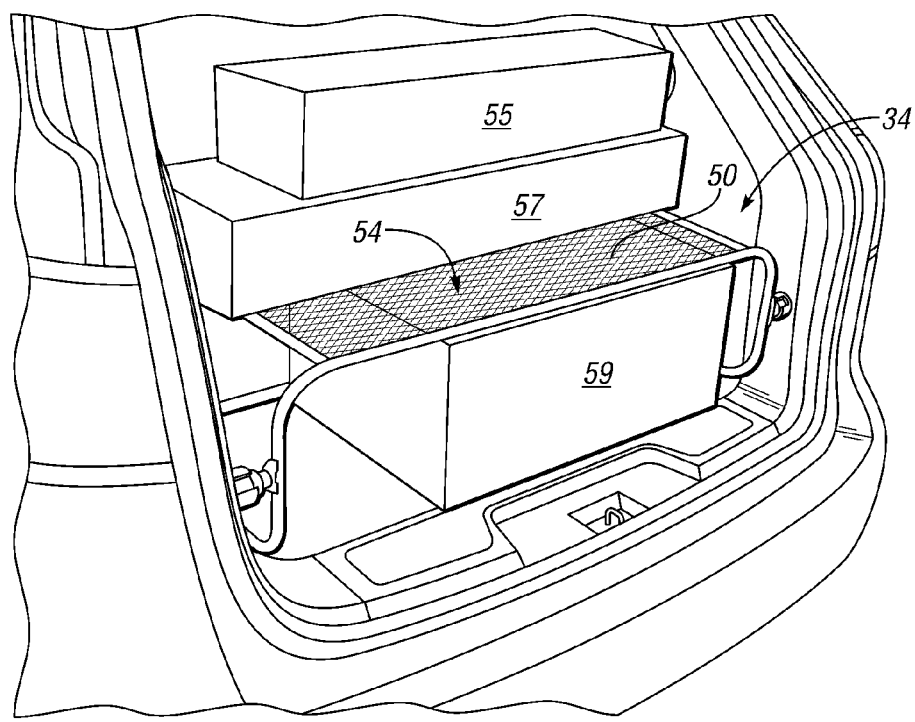
FIG. 4 is a schematic perspective fragmentary illustration of the vehicle of FIGS. 1-3 with the rear hatch closure panel in the open position and showing cargo on the floor and on a panel of the cargo area extender apparatus.

The cargo area-extending apparatus 34 includes a first panel 50 having a first side 52 forming a first loading surface 54 spaced above the floor 20 generally parallel with the floor 20 when the cargo area-extending apparatus 34 is in the stowed position, as shown in FIG. 1. Referring to FIG. 4, the first loading surface 54 is used to support cargo items 55, 57 above other cargo items, such as item 59 which is supported on the load floor 20 below the first panel 50. Thus, the cargo area-extending apparatus 34 allows two-tier loading.

Figure 5:
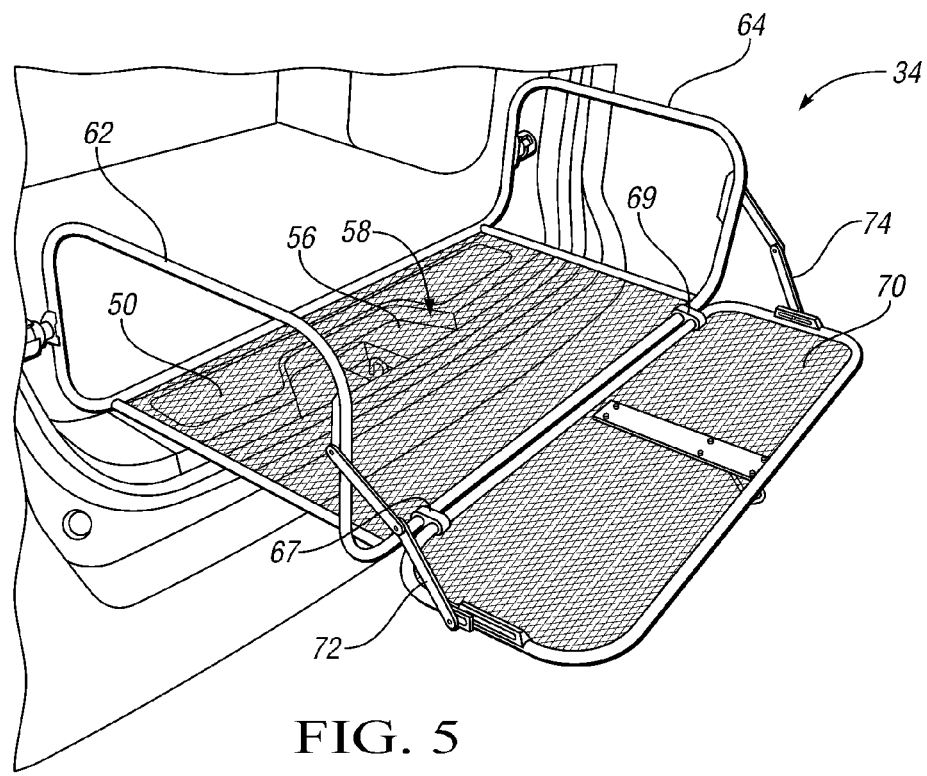
FIG. 5 is a schematic perspective fragmentary illustration of the vehicle of FIGS. 1-4 with the apparatus in a deployed position and a second panel pivoted downward substantially level with the first panel.

When the cargo-area-extending apparatus 34 is pivoted to the deployed position of FIG. 5, the first panel 50 is inverted relative to the stowed position, so that a second side 56 of the first panel 50 opposing the first side 52 (see FIG. 1) is now substantially level with the load floor 20 and forms a second loading surface 58. As used herein, a "panel" is a member forming a substantially flat support surface. The first panel 50 may be a relatively lightweight steel mesh material, or may be a non-mesh lightweight plastic, or other suitable material.

Referring again to FIG. 1, the cargo area-extending apparatus 34 includes a support frame 60 with a first support 62 and a second support 64 that extend from the sides 63, 65 of the first panel 50 to support the first panel 50 above the floor 20. In the embodiment shown, the first support 62 and the second support 64 are portions of metal tubing. If desired, the first support 62 and the second support 64 may have apertures that receive first and second adjustable leveling features 66, 68 similar to adjustable feet below the supports 62, 64. The adjustable leveling features 66, 68 may be adjusted to enable ends of the first panel 50 to be raised or lowered to ensure the surface 54 is sufficiently parallel with the load floor 20 for supporting cargo items. The leveling features 66, 68 may be T-shaped, with a threaded portion that extends into a threaded opening in the respective supports 62, 64. The features 66, 68 may be threaded into the supports 62, 64 different amounts to level the apparatus 34.

Figure 6:
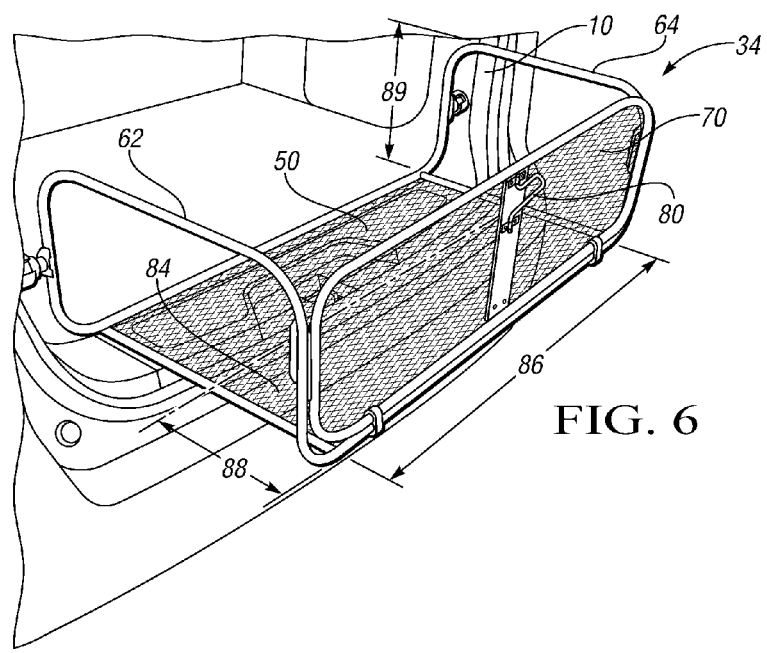
FIG. 6 is a schematic perspective fragmentary illustration of the vehicle of FIGS. 1-5 with the apparatus in the deployed position and a second panel pivoted upward substantially perpendicular with the first panel to form an endgate.
Figure 8:
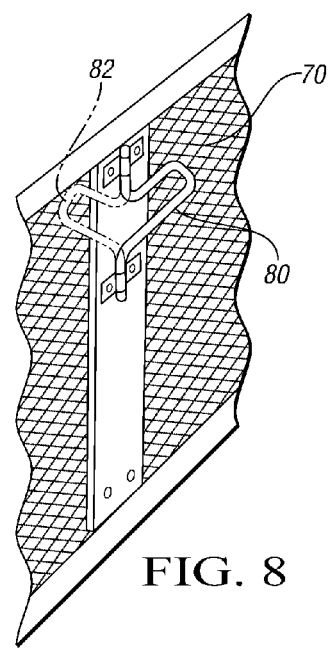
FIG. 8 is a schematic perspective fragmentary illustration of a portion of the second panel showing the second striker in the extended position and, in phantom, in a position substantially parallel with the second panel.

A second panel 70 is pivotably connected to the first panel 50 and may be positioned generally perpendicular to the first panel 50, as shown in FIG. 1, to support the first panel 50 above the floor 20 and to form a forward barrier for cargo below the first panel 50. The second panel 70 may also be a relatively lightweight steel mesh material, or may be a non-mesh lightweight plastic, or other suitable material. FIG. 5 shows straps 67, 69 securing the second panel 70 to the first panel 50 and hinges 72, 74 connected between the first and second supports 62, 64 and the second panel 70 that permit the second panel 70 to pivot relative to the first panel 50 to a position relatively level with the first panel 50 and the floor 20. When in the position of FIG. 5, it is easier to load cargo into the interior cargo area 14 and onto the second loading surface 58. Once cargo is loaded, the second panel 70 may be pivoted upward to be returned to a position relatively perpendicular to the first panel 50, as shown in FIG. 6, to form an endgate. An "endgate" is a generally upright panel positioned at a rear of a vehicle that partially encloses the cargo area. The second panel 70 has a second striker 80 that extends from the second panel as shown in FIG. 6, or may be pivoted to a position 82 relatively flush with the second panel as shown in phantom in FIG. 8. The position 82 may be useful when the apparatus 34 is in the stowed position of FIG. 1, so that the second striker 80 occupies only minimal fore-aft cargo space forward of the second panel 70.

Figure 7:
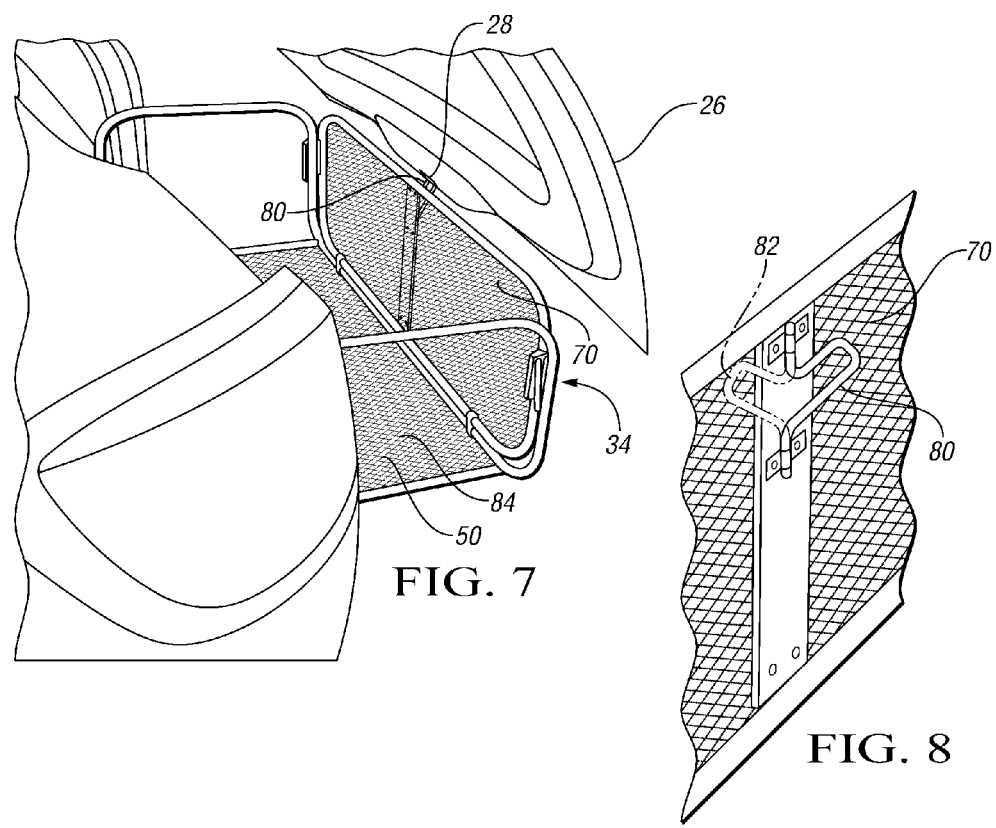
FIG. 7 is a schematic perspective fragmentary illustration of the vehicle of FIGS. 1-6 with the apparatus in the deployed position and the second panel pivoted upward substantially perpendicular with the first panel to form an endgate, and with the rear hatch closure panel in a partially closed position and latched to a striker on the apparatus.

Referring to FIG. 7, when the apparatus 34 is in the deployed position with the second panel 70 pivoted relative to the first panel 50 to form an endgate, the rear hatch closure panel 26 can be lowered to a partially closed position (i.e., between the open position of FIG. 2 and the closed position of FIG. 3) in which the latch 28 will engage the extended second striker 80 to secure the rear hatch closure panel 26 to the apparatus 34. As can be seen in FIGS. 6 and 7, a portion 84 of the apparatus 34 extends outside of the cargo area when the apparatus 34 is in the deployed position, thereby increasing the interior cargo area 14 of the vehicle 10. Referring to FIG. 6, the added cargo area for loading is approximately equal to the product of the width 86 of the first panel 50 and the portion 88 of the depth of the first panel 50 that extends outside of the vehicle 10. The added cargo volume is equal to at least the product of the added cargo area and the height 89 of the support portions 62, 64 above the first panel 50 when the apparatus 34 is in the deployed position. The support portions 62, 64 are positioned to function as side barriers when the apparatus 34 is in the deployed position of FIG. 6, helping to contain cargo.

While the best modes for carrying out the invention have been described in detail, those familiar with the art to which this invention relates will recognize various alternative designs and embodiments for practicing the invention within the scope of the appended claims.

The invention claimed is:

1. An apparatus for a vehicle with a rear hatch closure panel and a vehicle body that defines an interior cargo area and has sides, a roof, and a floor, the apparatus comprising:
    a first striker attached to the floor of the vehicle body;
    a first panel defining a loading surface and having first and second sides;
    a support frame connected to the first panel and including first and second supports;
    a second panel having a second striker connected thereto, the second panel pivotably connected to the first panel;
    wherein the first and second supports are configured to be selectively connectable to and releasable from the vehicle body;
    wherein the apparatus is positionable in a stowed position when the supports are connected to the vehicle body and in which the apparatus is within the interior cargo area and the first panel is substantially parallel with and above the floor;
    wherein the apparatus is pivotable with respect to the vehicle body to a deployed position in which the supports are connected to the vehicle body and in which the apparatus extends at least partially out of the vehicle to provide additional cargo area;
    wherein the rear hatch closure panel is attached to the roof of the vehicle body and is openable to allow access to the interior cargo area and has a latch configured to attach to one of the first striker and the second striker to secure the rear hatch closure panel;
    wherein the first striker is configured to receive the latch when the apparatus is in the stowed position to thereby close the interior cargo area and secure the rear hatch closure panel; and
    wherein the second striker is configured to receive the latch when the apparatus is in the deployed position to thereby latch the rear hatch closure panel to the apparatus.

2. The apparatus of claim 1, wherein the second striker is configured to be pivotable with respect to the second panel between a first position in which the second striker is generally flush with the second panel and a second position in which the second striker extends from the second panel sufficiently to receive the latch.

3. The apparatus of claim 1, further comprising:
    at least one hinge connecting the second panel to the support frame and selectively extendable to allow pivoting of the second panel relative to the first panel; and wherein the second panel is pivotable to a position substantially level with the first panel in when the apparatus is in the deployed position.

4. The apparatus of claim 1, further comprising:
first and second adjustable leveling features extending from the first and second supports, respectively, and wherein the first and second adjustable leveling features are configured to be adjustable relative to the first and second supports to adjust the position of the first panel relative to the floor when the apparatus is connected to the vehicle body and is in the stowed position.

5. The apparatus of claim 1, wherein the first and second supports include first and second post portions, respectively, extending generally parallel with the floor and configured to be pivotably supported by the vehicle body.

6. A vehicle comprising:
a vehicle body having a roof, sides, and a floor and defining an interior cargo area;
a liftgate pivotably connected to the roof of the vehicle body and movable between an open position and a closed position to open and close the interior cargo area; wherein the liftgate has a latch;
a first striker connected to the floor of the vehicle body and configured to receive the latch when the liftgate is in the closed position;
an apparatus pivotably connected to the vehicle body and pivotable from a stowed position to a deployed position; wherein the apparatus is within the interior cargo area in the stowed position when the liftgate is in the closed position; wherein the apparatus extends outside of the vehicle when in the deployed position; wherein the apparatus includes:
a panel positioned substantially parallel with and above the floor when the apparatus is in the stowed position and substantially level with the floor and extending outside of the interior cargo area when the apparatus is in the deployed position; and
a second striker configured to receive the latch when the apparatus is in the deployed position, with the liftgate thereby secured to the apparatus and in a partially closed position between the open position and the closed position.

7. The vehicle of claim 6, wherein the panel is a first panel; and wherein the apparatus includes:
a second panel pivotable with respect to the first panel; wherein the second panel is positioned generally perpendicular to the first panel both in the stowed position to support the first panel above the floor and in the deployed position to form an endgate; and
wherein the second striker is configured to be pivotable with respect to the second panel between a first position in which the striker is generally parallel with the second panel and a second position in which the striker extends from the second panel sufficiently to receive the latch.

8. The vehicle of claim 7, wherein the second panel is pivotable to be substantially level with the first panel in the deployed position for loading the vehicle.

9. The vehicle of claim 6, wherein the apparatus includes first and second post portions, respectively, extending generally parallel with the floor and configured to be pivotably supported by the vehicle body.

10. The vehicle of claim 6, wherein the vehicle is a rear hatch-type vehicle.

11. A vehicle comprising:
a vehicle body having a roof, sides, and a floor and defining an interior cargo area and an opening;
a first striker connected to the floor of the vehicle body;
a rear hatch closure panel having a latch and hinged to the roof of the vehicle body; wherein the rear hatch closure panel is configured to close with the latch engaging the first striker to prevent access to the interior cargo area through the opening; wherein the rear hatch closure panel is configured to unlatch from the first striker and open to provide access to the interior cargo area through the opening;
an apparatus having:
a first panel defining a first loading surface on a first side and a second loading surface on a second side opposing the first side;
a support frame extending from the first panel and including first and second supports;
a second panel pivotably connected to the first panel;
a second striker connected to the second panel;
wherein the first and second supports are configured to be selectively connectable to and releasable from the vehicle body such that the apparatus is pivotable with respect to the vehicle body at the first and second supports when the first and second supports are connected to the vehicle body;
wherein the apparatus is positionable in a stowed position in which the apparatus is within the interior cargo area and the first panel is supported by the support frame such that the first panel is substantially parallel with and above the floor with the first loading surface positioned for supporting cargo;
wherein the apparatus is pivotable with respect to the vehicle body to a deployed position in which the apparatus extends at least partially out of the vehicle with the second loading surface positioned for supporting cargo;
wherein the first striker is configured to receive the latch when the apparatus is in the stowed position, thereby latching the rear hatch closure panel to the vehicle body; and
wherein the second striker is configured to receive the latch when the apparatus is in the deployed position to thereby latch the rear hatch closure panel to the apparatus.

12. The vehicle of claim 11, wherein the second striker is configured to be pivotable with respect to the second panel between a first position in which the second striker is generally parallel to the second panel and a second position in which the second striker extends from the second panel sufficiently to receive the latch.

13. The vehicle of claim 11, further comprising:
at least one hinge connecting the second panel to the support frame and selectively extendable to allow pivoting of the second panel relative to the first panel; and
wherein the second panel is pivotable to a position substantially level with the first panel when the apparatus is in the deployed position.

14. The vehicle of claim 11, further comprising:
first and second adjustable leveling features extending from the first and second supports, respectively, and wherein the first and second adjustable leveling features are configured to be adjustable relative to the first and second supports to adjust the position of the first panel relative to the floor when the apparatus is connected to the vehicle body and is in the stowed position.

15. The vehicle of claim 11, wherein the first and second supports include first and second post portions, respectively, extending generally parallel with the floor and configured to be pivotably supported on the vehicle body.

16. The vehicle of claim 11, wherein the vehicle is a rear hatch-type vehicle.

* * * * *